(12) United States Patent
Lowder et al.

(10) Patent No.: US 12,176,673 B2
(45) Date of Patent: Dec. 24, 2024

(54) OPTICAL FIBER DEVICES AND METHODS FOR REDUCING STIMULATED RAMAN SCATTERING (SRS) LIGHT EMISSIONS FROM A RESONANT CAVITY

(71) Applicant: nLIGHT, Inc., Camas, WA (US)

(72) Inventors: Tyson L. Lowder, Vancouver, WA (US); Dahv A. V. Kliner, Portland, OR (US); C. Geoffrey Fanning, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 791 days.

(21) Appl. No.: 17/418,707

(22) PCT Filed: Dec. 19, 2019

(86) PCT No.: PCT/US2019/067549
§ 371 (c)(1),
(2) Date: Jun. 25, 2021

(87) PCT Pub. No.: WO2020/139708
PCT Pub. Date: Jul. 2, 2020

(65) Prior Publication Data
US 2022/0085567 A1    Mar. 17, 2022

Related U.S. Application Data

(60) Provisional application No. 62/786,182, filed on Dec. 28, 2018.

(51) Int. Cl.
*H01S 3/30* (2006.01)
*H01S 3/067* (2006.01)

(52) U.S. Cl.
CPC ............ *H01S 3/302* (2013.01); *H01S 3/0675* (2013.01); *H01S 2301/03* (2013.01)

(58) Field of Classification Search
CPC .... H01S 3/1086; H01S 3/108; H01S 3/06754; H01S 3/0675; H01S 3/06716; H01S 3/067; H01S 3/30
See application file for complete search history.

(56) References Cited

U.S. PATENT DOCUMENTS 5,703,978 A    12/1997 Digiovanni et al.
6,710,916 B1 *  3/2004 Bolshtyansky .... G02B 6/29317
                                                    398/81

(Continued)

FOREIGN PATENT DOCUMENTS

CN    1528035 A    9/2004
CN    1592992 A    3/2005

(Continued)

OTHER PUBLICATIONS

International Search Report and Written Opinion for International Patent Application No. PCT/US2019/067549, mailed Mar. 26, 2020, 7 pages.

(Continued)

*Primary Examiner* — Kinam Park
(74) *Attorney, Agent, or Firm* — WILEY REIN LLP (57) ABSTRACT

Fiber laser devices, systems, and methods for reducing Raman spectrum in emissions from a resonant cavity. A fiber laser oscillator that is to generate an optical beam may include a Raman reflecting output coupler that strongly reflects a Raman component pumped within the resonant cavity, and partially reflects a signal component to sustain the oscillator and emit a signal that has a reduced Raman component. A Raman filtering output coupler may comprise a superstructure fiber grating, and such a grating may be chirped or otherwise designed to have a desired bandwidth.

16 Claims, 7 Drawing Sheets

(56) References Cited

U.S. PATENT DOCUMENTS

| | | | |
|---|---|---|---|
| 6,985,283 B1* | 1/2006 | Islam | H01S 3/302 |
| | | | 359/334 |
| 2003/0063629 A1* | 4/2003 | Davis | H01S 3/0675 |
| | | | 372/6 |
| 2004/0086004 A1* | 5/2004 | Bonaccini | H01S 3/094015 |
| | | | 372/6 |
| 2005/0063430 A1* | 3/2005 | Doucet | H01S 3/0675 |
| | | | 372/102 |
| 2014/0204387 A1* | 7/2014 | Narayanan | H01S 3/10023 |
| | | | 356/461 |
| 2016/0111851 A1* | 4/2016 | Kliner | H01S 3/0675 |
| | | | 359/334 |
| 2016/0285230 A1 | 9/2016 | Nicholson et al. | |
| 2017/0271837 A1* | 9/2017 | Hemenway | H01S 3/1001 |
| 2018/0217322 A1* | 8/2018 | Brochu | G02B 6/02085 |
| 2022/0069538 A1* | 3/2022 | Lowder | G02B 6/0208 |

FOREIGN PATENT DOCUMENTS

| | | |
|---|---|---|
| CN | 109038205 A | 12/2018 |
| WO | 02093697 A2 | 11/2002 |
| WO | 2003041231 A1 | 5/2003 |

OTHER PUBLICATIONS

Xu Haiyang et al., "Spectral Shaping for Suppressing Stimulated-Raman-Scattering in a Fiber Laser", Applied Optics, vol. 56, No. 12, Apr. 20, 2017, 5 pages.

* cited by examiner

OPTICAL FIBER DEVICES AND METHODS FOR REDUCING STIMULATED RAMAN SCATTERING (SRS) LIGHT EMISSIONS FROM A RESONANT CAVITY

RELATED APPLICATIONS

This application is a National Stage of International Application No. PCT/US2019/067549, filed Dec. 19, 2019, which claims priority to U.S. Provisional Patent Application No. 62/786,182, filed on Dec. 28, 2018 and titled "Optical Fiber Devices and Methods for Reducing Stimulated Raman Scattering (SRS) Light Emissions From a Resonant Cavity," which are hereby incorporated by reference in their entireties.

BACKGROUND

The fiber laser industry continues to increase laser performance metrics, such as average power, pulse energy and peak power. Pulse energy and peak power are associated with the storage and extraction of energy in the fiber while mitigating nonlinear processes that can have adverse impacts on the temporal and spectral content of the output pulse. Stimulated Raman Scattering (SRS) light is the result of one such nonlinear process associated with vibrations of the fiber media (e.g., glass). SRS is typically an undesired byproduct of fiber laser and/or fiber amplifier signal light passing through the optical fibers that these systems comprise.

Generation of SRS light can reduce power in an intended signal output wavelength. SRS generation can also destabilize laser emission resulting in undesired output power fluctuations. SRS generation may also have detrimental effects on the spatial profile of laser system emission. SRS may also be re-introduced in laser and amplifier systems by reflections from objects internal to, or external to, the laser system, such as optics used to manipulate the laser or amplifier output, or the workpiece to which the laser light output is applied. Such reflections can also destabilize the laser emission. Once generated, a laser and/or amplifier of a fiber system may amplify SRS light to the point of causing catastrophic damage to components internal to the system (e.g., a fiber laser, or fiber amplifier). The SRS light may also be detrimental to components external to the fiber system because the external components may not be specified for the wavelength of the SRS light. This mismatch in wavelength between what is delivered versus what is expected can lead to undesirable performance at the workpiece or may cause an eye safety concern for the external system in which the fiber system was integrated. As such, it may be desirable to suppress SRS generation within a fiber system, remove SRS light from a fiber system, and/or otherwise mitigate one or more of the undesirable effects of SRS light.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. It should also be noted that directions and references, for example, up, down, top, bottom, and so on, may be used merely to facilitate the description of features in the drawings. Therefore, the following detailed description is not to be taken in a limiting sense and the scope of claimed subject matter is defined solely by the appended claims and their equivalents.

In the following description, numerous details are set forth. However, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The term "luminance" is a photometric measure of the luminous intensity per unit area of light travelling in a given direction. The term "numerical aperture" or "NA" of an optical system is a dimensionless number that characterizes the range of angles over which the system can accept or emit light. The term "optical intensity" is not an official (SI) unit, but is used to denote incident power per unit area on a surface or passing through a plane. The term "power density" refers to optical power per unit area, although this is also referred to as "optical intensity" and "fluence." The term "radial beam position" refers to the position of a beam in a fiber measured with respect to the center of the fiber core in a direction perpendicular to the fiber axis. The term "radiance" is the radiation emitted per unit solid angle in a given direction by a unit area of an optical source (e.g., a laser). Radiance may be altered by changing the beam intensity distribution and/or beam divergence profile or distribution. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle. The term "optical power" is energy per unit time, as is delivered by a laser beam, for example. The term "guided light" describes light confined to propagate within an optical waveguide. The term "cladding mode" is a guided propagation mode supported by a waveguide within one or more cladding layers of an optical fiber. The term "core mode" is a guided propagation mode supported by a waveguide within one or more core layers of an optical fiber.

Figure 2:
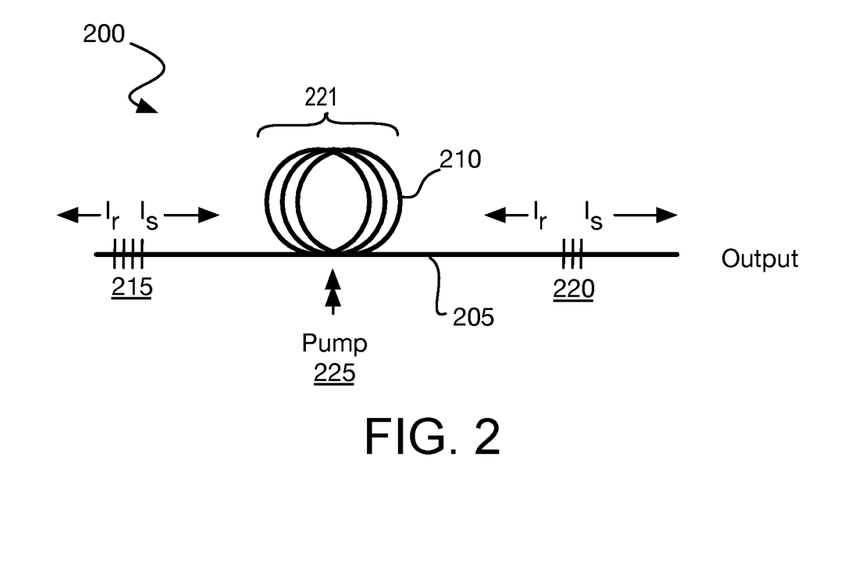
FIG. 2 is a schematic of a fiber laser oscillator including an output coupler for reducing Raman component power in resonant cavity emissions, in accordance with some embodiments.

Described herein are optical fiber devices, systems, and methods suitable for one or more of suppressing SRS generation within a fiber system, removing SRS light from a fiber system, and/or otherwise mitigating one or more undesirable effects of SRS within a fiber system. As described further below, a fiber laser oscillator that is to generate an optical beam may include a Raman reflecting output coupler 220 that strongly reflects a Raman component pumped within the resonant cavity, and partially reflects a signal component to sustain the oscillator and emit a signal that has a reduced Raman component. A Raman filtering output coupler may comprise a superstructure fiber grating, and such a grating may be chirped or otherwise designed to have a desired bandwidth.

Figure 1:
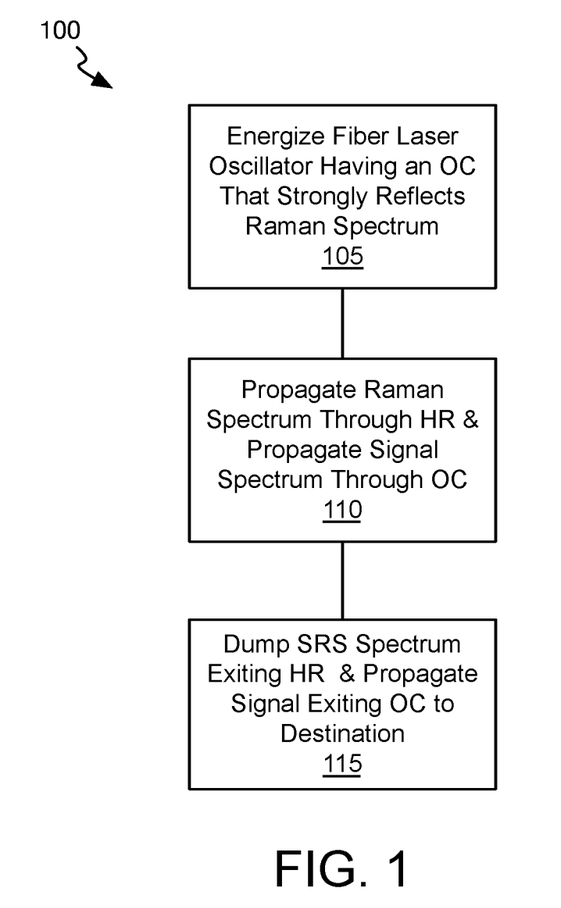
FIG. 1 is a flow chart illustrating methods for reducing the power of a Raman component in resonant cavity emissions, in accordance with some embodiments.

FIG. 1 is a flow chart illustrating methods 100 for reducing Raman component power in resonant cavity emissions, in accordance with some embodiments. Methods 100 may be implemented with a fiber laser oscillator where signal power and/or fiber length of the resonant cavity is sufficient to generate a Raman component having significant power. Methods 100 may be implemented as a means of reducing energy of a Raman component of light coupled from a fiber laser oscillator, and for example, into another length of fiber outside of the resonant cavity.

Methods 100 begin at block 105 where a fiber laser oscillator comprising a length of doped fiber is energized, for example through any optical pumping technique. The fiber is to support at least one core propagation mode. Upon energizing, the oscillator generates a light beam having a signal component $I_s$. The signal component $I_s$ may have any range of optical power per frequency or wavelength (W/nm) over a predetermined signal power spectrum. The signal power spectrum may be associated with a peak wavelength $\lambda_s$ of some maximum optical power. The first signal spectrum may have any band characteristics, and may, for example, comprise a band known to be suitable for continuous wave (CW) and/or pulsed fiber laser systems (e.g., with a micrometer peak wavelength $\lambda_s$, such as 1050 nm, 1060 nm, 1070 nm, 1080 nm, etc.). In some exemplary embodiments, the signal component $I_s$ has a unimodal spectrum having a single peak power. The peak wavelength $\lambda_s$ may be a center wavelength of the single-peaked spectrum, for example. Although the signal component $I_s$ may have any optical power, in some exemplary fiber laser embodiments the signal component $I_s$ power is at least 50 W, advantageously at least 100 W, and more advantageously at least 250 W.

The light beam energized within the resonant cavity may further comprise a first Raman component $I_r$. The Raman component $I_r$ may develop within the resonant cavity as a result of scattering phenomena associated with the fiber propagation media, for example. The Raman component $I_r$ has some range of some power per frequency or wavelength (W/nm) over an "SRS" or "Raman" power spectrum comprising one or more Raman wavelengths. The Raman power spectrum may be associated with a peak wavelength $\lambda_r$ of maximum optical power. The Raman component $I_r$ spans wavelengths shifted longer (e.g., about 50 nm) from those of the signal component $I_s$. The Raman component $I_r$ may also have a broader band than signal component $I_s$, for example as a result of noise. In some illustrative embodiments where the first signal component $I_s$ has a peak wavelength $\lambda_s$ of 1080 nm, the derivative Raman component $I_r$ may have Raman peak wavelength $\lambda_r$ around 1135 nm. The power of the Raman peak wavelength $\lambda_r$ may vary as a function of the signal power spectrum that stimulates the first Raman component $I_r$.

As described further below, the oscillator energized at block 105 is to further comprise a resonant cavity defined, in part, by a first optical reflector that strongly reflects one or more wavelengths within the Raman spectrum. In advantageous embodiments, at block 105 wavelengths within the signal spectrum are also reflected, but one or more Raman wavelengths are reflected more strongly than are one or more wavelengths within the signal spectrum. As such, at block 110, a fraction of the signal spectrum that is output from the resonant cavity through the first reflector is larger than a fraction of the Raman spectrum that is propagated through the first reflector. This signal selective reflector may therefore be further operated as a signal output coupler between the oscillator and another length of fiber.

A second reflector that strongly reflects the one or more wavelengths within the signal spectrum may further define the resonant cavity. The second reflector may be a "high reflector" that strongly reflects signal spectrum. The second reflector need not reflect Raman spectrum. One or more signal wavelengths may be reflected by this second reflector more strongly than one or more wavelengths within the Raman spectrum. As such, at block 115, a fraction of Raman spectrum may be transmitted out of the resonant cavity through the second reflector. Any SRS energy allowed to exit one end of the resonant cavity may be dumped, for example into a suitable optical absorber and/or heatsink. Hence, in accordance with some embodiments herein, the relative strength of the first and second reflectors defining a laser oscillator may be tuned to be complementary between the Raman and signal spectrum so as to facilitate separation of these two spectra, with individual ones of the spectra transmitted primarily out of opposite ends of the fiber propagation media of a resonant cavity.

FIG. 2 is a schematic of a laser oscillator 200 including an output coupler for reducing Raman component power from a signal emission of the oscillator, in accordance with some embodiments. Oscillator 200 is to generate an optical beam by exciting a signal spectrum of light. Oscillator 200 comprises an optical cavity defined within a propagation fiber 205 by a first fiber grating 215 proximal to a first end of fiber 205, and a second fiber grating 220 proximal to a second end of fiber 205. Fiber 205 is suitable for supporting at least one guided core mode (i.e., fiber 205 may be single mode or multi-mode fiber). Within fiber 205 the signal component $I_s$ and the Raman component $I_r$ may each propagate in a core guided mode $lm_1$, for example. In some examples, the core guided mode is a linear polarized mode $LP_{lm}$, with one embodiment being the linearly polarized fundamental transverse mode of the optical fiber core, $LP_{01}$. $LP_{01}$ has desirable characteristics in terms of beam shape, minimal beam expansion during propagation through free space (often referred to as "diffraction limited"), and optimum focusability. Hence, fundamental mode $LP_{01}$ propagation is often advantageous in the fiber laser industry. With sufficient core diameter $D_{core,1}$, and/or NA contrast, fiber 205 may support the propagation of more than one transverse optical mode. For example, fiber 205 may comprise large mode area (LMA) fiber that is operable in an LMA regime, etc.

Figure 3A:
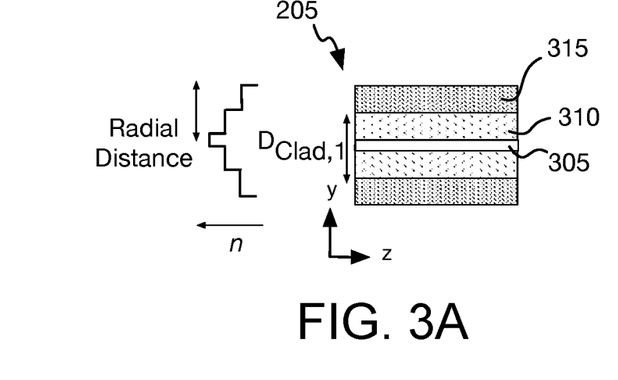
FIGS. 3A and 3B are longitudinal and transverse cross-sectional views of a fiber for a resonant cavity, in accordance with some embodiments.
Figure 3B:
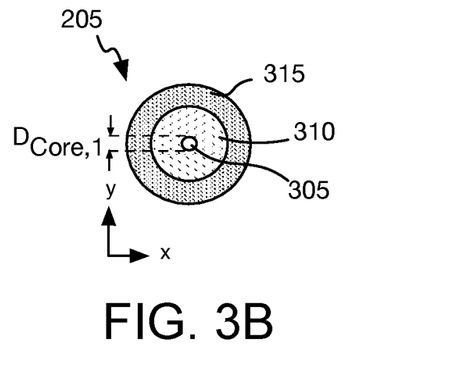

FIGS. 3A and 3B are longitudinal and transverse cross-sectional views of fiber 205, respectively, in accordance with some multi-clad fiber embodiments. Although a double clad fiber embodiment is illustrated, fiber 205 may have any number of cladding layers (e.g., single, triple, etc.) known to be suitable for optical fiber. In the example illustrated in FIGS. 3A and 3B, fiber 205 has a central core 305, and an inner cladding 310, which is annular and encompasses core 305. An annular outer cladding 315 surrounds inner cladding 310. Core 305 and inner cladding 310 may have any suitable composition (e.g., glass of any of a variety of materials, such as, $SiO_2$, $SiO_2$ doped with $GeO_2$, germanosilicate, phosphorus pentoxide, phosphosilicate, $Al_2O_3$, aluminosilicate, or the like, or any combinations thereof). Outer cladding 315 may be a polymer or also a glass, for example. Although not depicted, one or more protective (non-optical) coatings may further surround outer cladding 315.

Fiber 205 may have any suitable refractive index profile (RIP). As used herein, the "refractive-index profile" or "RIP" refers to the refractive index as a function of position along a line (e.g., x or y axis in FIG. 3B) or in a plane (e.g. x-y plane in FIG. 3B) perpendicular to the fiber axis (e.g., z-axis in FIG. 3A). In the example shown in FIG. 3B, the RIP is radially symmetric, in which case the RIP is identical for any azimuthal angle. Alternatively, for example as for birefringent fiber architectures, RIP may vary as a function of azimuthal angle. Core 305, inner cladding 310, and outer cladding 315 can each have any RIP, including, but not limited to, a step-index and graded-index. A "step-index fiber" has a RIP that is substantially flat (refractive index independent of position) within fiber core 305. Inner cladding 310 may also have a substantially flat refractive index (RI) over $D_{Clad,1}$, with RI stepped at the interface between core 305 and inner cladding 310. An example of one illustrative stepped RIP suitable for a fiber laser is shown in FIG. 3A. Alternatively, one or more of core 305 and inner cladding 310 may have a "graded-index" in which the RI varies (e.g., decreases) with increasing radial position (i.e., with increasing distance from the core and/or cladding axis).

Inner cladding 310 may have an area larger than that of the core 305, and may also have a higher NA. Although core 305 and inner cladding 310 is illustrated as being concentric (i.e., a centered core), they need not be. One or more of core 305 and cladding 310 may also be a variety of shapes other than circular, such as, but not limited to annular, polygonal, arcuate, elliptical, or irregular. Core 305 and inner cladding 310 in the illustrated embodiments are co-axial, but may alternatively have axes offset with respect to one another. Although $D_{Clad,1}$ and $D_{Core,1}$ are illustrated to be constants about a central fiber axis in the longitudinal direction (z-axis in FIG. 3A). The diameters $D_{Clad,1}$ and $D_{Core,1}$ may instead vary over a longitudinal fiber length. In some exemplary embodiments, the core diameter $D_{Core,1}$ is in the range of 10-100 micron (μm) and the inner cladding diameter $D_{Clad,1}$ is in the range of 100-1000 μm, although other values for each are possible.

Returning to FIG. 2, fiber 205 includes a doped fiber length 210, which may include any suitable optically active gain media. In some embodiments, doped fiber length 210 comprises rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like, or any combination thereof. One or more cladding layers may surround the core of fiber 205 and/or of doped fiber length 210. Laser oscillator 200 is optically coupled to a pump light source 225, which may be a solid state diode laser, or lamp, for example. Where doped fiber length 210 comprises a multi-clad fiber, pump light source 225 may be coupled into a cladding layer in either a co-propagating or counter-propagating manner.

Figure 4:
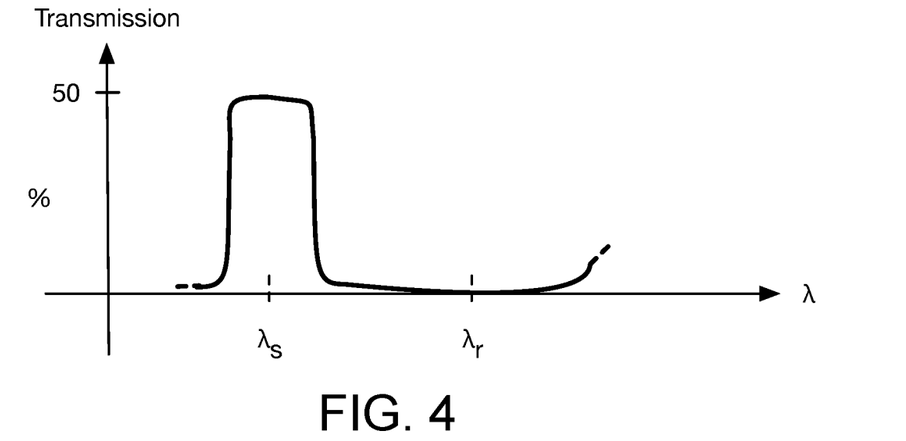
FIG. 4 is a graph illustrating transmission spectrum of an output coupler suitable for reducing Raman component power in resonant cavity emissions, in accordance with some embodiments.

Raman reflective output coupler 220 is operable as a signal output coupler (OC) that is to transmit out of oscillator 200 a fraction of signal spectrum $I_s$ propagating in a core mode of fiber 205. Raman reflective output coupler 220 is further operable as an SRS suppression grating that reflects Raman spectrum $I_r$ propagating in a core (e.g., fundamental) mode of fiber 205 into a counter-propagating core (e.g., fundamental) mode of fiber 205. Raman reflective output coupler 220 is sufficiently wavelength sensitive to discriminate one or more signal wavelengths from one or more Raman wavelengths. In the illustrated embodiment, Raman reflective output coupler 220 is a superstructure fiber grating (SS-FG) comprising a plurality of smaller fiber gratings placed in proximity to one another, as described further below. Raman reflective output coupler 220 may advantageously have a lower reflectivity at least at the peak signal wavelength $\lambda_s$ than at the peak Raman wavelength $\lambda_r$. FIG. 4 is a graph illustrating percent transmission as a function of wavelength for a fiber grating that is suitable for reducing Raman component power in resonant cavity emissions, in accordance with some embodiments. Raman reflective output coupler 220 may display the transmission characteristics illustrated in FIG. 4, for example having high (e.g., more than 50%) transmission over a first wavelength band that includes peak signal wavelength $\lambda_s$, and a low (e.g., less than 5%) transmission over a second wavelength band that includes peak Raman wavelength $\lambda_r$.

Fiber grating 215, being proximal to an end of fiber 205 opposite Raman reflective output coupler 220, is to also strongly reflect at least the signal component $I_s$, and may therefore be operable as a "high reflector" having a higher reflectivity at the peak signal wavelength $\lambda_s$. In exemplary embodiments, fiber grating 215 may further have a reflectivity at the peak signal wavelength $\lambda_s$ that is higher than its reflectivity at the peak Raman wavelength $\lambda_r$. In some such embodiments, reflectivity of fiber grating 215 at the peak Raman wavelength $\lambda_r$ is lower than reflectivity of the Raman reflective output coupler 220 at the peak Raman wavelength $\lambda_r$. Fiber grating 215 may therefore be further operable to transmit out of oscillator 200 a fraction of Raman spectrum $I_r$ propagating in a core mode of fiber 205. Fiber grating 215 may also be sufficiently wavelength sensitive to discriminate one or more signal wavelengths from one or more Raman wavelengths, with a reflectivity complementary to that of Raman reflective output coupler 220. Fiber grating 215 may have a wider or narrower bandwidth than Raman reflective output coupler 220. In the illustrated embodiment, fiber grating 215 is a single fiber Bragg grating (FBG). Optionally however, fiber grating 215 may have a more complex architecture (e.g., including one or more of superstructure, chirp, or apodization).

Figure 5A:
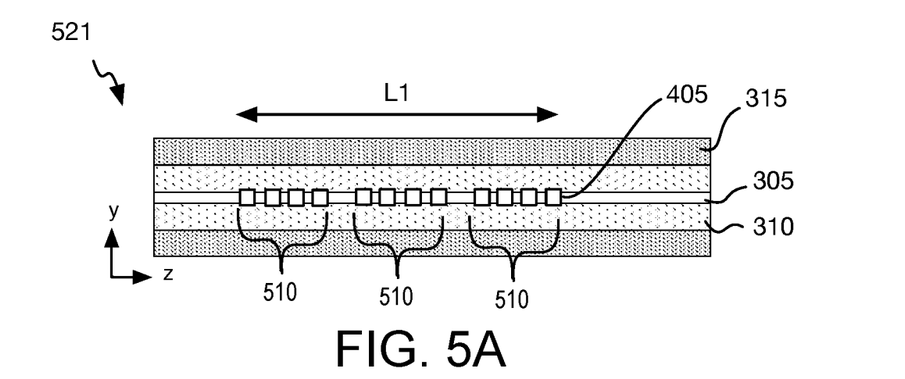
FIG. 5A is a longitudinal cross-sectional view of a super-structure fiber grating (SS-FG), in accordance with some embodiments.

FIG. 5A is an expanded cross-sectional view of a length of fiber that includes a superstructure fiber grating (SS-FG) 521, in accordance with some embodiments. SS-FG 521 may be employed as Raman reflective output coupler 220 (FIG. 2), for example. SS-FG 521 can produce multiple reflection peaks from a single grating writing process that does not rely on multiple phase masks, and may occupy considerably less fiber length than would multiple FBGs. SS-FG 521 is to interact with the core modes electric field and induce a modulation of amplitude or phase within a long periodic (LP) structure. Interaction can be direct, or evanescent. Structural modulations of the grating can therefore be located within the cladding, or even comprise external surface perturbations. However, in the example illustrated, SS-FG 521 comprises refractive index (RI) perturbations 405 within at least fiber core 305 over a superstructure grating length L1. In the illustrated example, SS-FG 521 is within a double-clad fiber, for example having one or more of the attributes described above for fiber 205. RI perturbations 405 have a refractive index $n_4$ that is higher than a nominal core index $n_3$. For embodiments where outer cladding 315 has an index $n_1$, and inner cladding 310 has an index $n_2$, RI within mode SS-FG 521 may vary as $n_1 < n_2 < n_3 < n_4$. RI perturbations 405 may impact light guided within core 305 over a target range of wavelengths while light outside of the target band may be substantially unaffected by RI perturbations 405. As shown, SS-FG 521 comprises a plurality of subgratings 510, each having a short period. Subgratings 510 are adjacent to each other and separated by some spacing to have a long period.

Figure 5B:
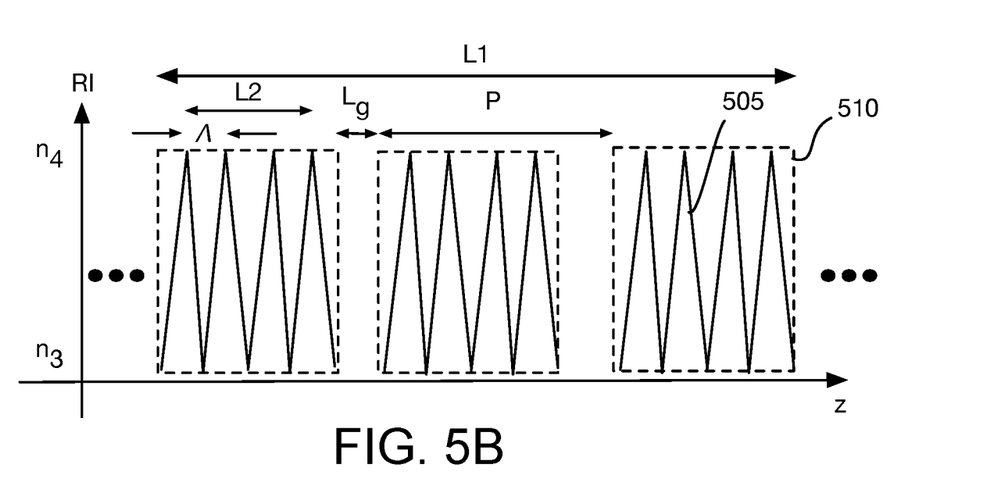
FIG. 5B is a graph of refractive index modulation within an SS-FG, in accordance with some embodiments.

FIG. 5B is graph of refractive index over a length of SS-FG 521, in accordance with some embodiments. As shown, RI has an amplitude modulation in which the period P is defined as the sum of the length of one subgrating L2, and the length of one non-grating gap $L_{gap}$. SS-FG 521 has a duty cycle D that is the ratio of the subgrating length L2 to the superstructure period P. Each subgrating 510 may have a period $\Lambda$. The subgrating sections 510 define a broad reflection band and together the plurality of subgratings 510 define peaks within the broad reflection band. Various reflection peaks suitable for reflection of the Raman component $I_r$ can be achieved by defining the period and duty cycle of SS-FG 521. Subgrating parameters (e.g., period $\Lambda$, RI modulation amplitude) may be predetermined to specify the fraction of light reflected at each of the peak signal wavelength $\lambda_s$ and the peak Raman wavelength $\lambda_r$. The subgrating period $\Lambda$ and/or RI modulation amplitude may be controlled to reflect the signal component $I_s$ and the Raman component $I_r$ by amounts appropriate for both signal output coupling and strong Raman reflection.

The subgrating period $\Lambda$ may vary as a function of the Raman spectrum, but is generally to be less than half of the peak Raman wavelength $\lambda_r$, which is a sufficiently short period that wavelength within the Raman component $I_r$ will satisfy a Bragg condition and be reflected back into a counter-propagating core mode. SS-FG 521 may therefore also be referred to as a superstructure fiber Bragg grating (SFBG or SS-FGB). In some further embodiments, the superstructure period P is significantly greater than half the peak Raman wavelength $\lambda_r$ and may be ten, or more, times the half the peak Raman wavelength $\lambda_r$. In some specific examples where the peak Raman wavelength $\lambda_r$ is 1135 nm, subgrating period $\Lambda$ is less than 570 nm (e.g., 391 nm if $n_{eff}$ is assumed 1.45), while superstructure period P may be between 10 μm and 1000 μm.

Figure 6:
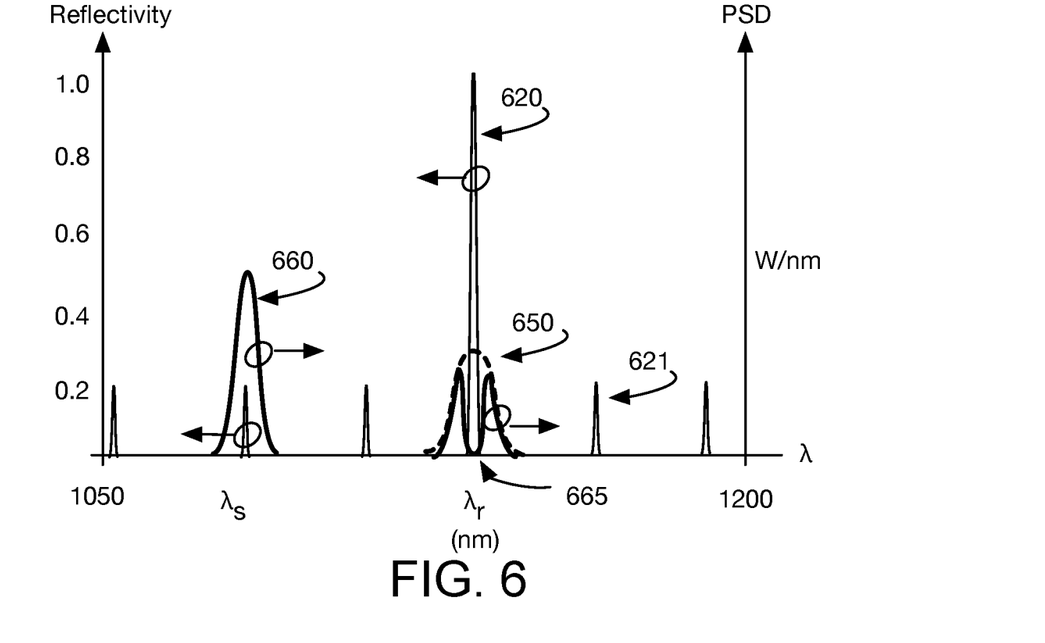
FIG. 6 is a graph illustrating reflectivity of a SS-FG and power spectral distribution (PSD) of output from a fiber laser oscillator employing an SS-FG, in accordance with some embodiments.

FIG. 6 is a graph illustrating reflectivity of an exemplary SS-FG and power spectral distribution (PSD) for a fiber laser device employing an SS-FG, in accordance with some embodiments. The spectral functions illustrated may be generated from models of laser oscillator 200, for example. Representative wavelengths suitable for high power fiber lasers are illustrated, but the information conveyed in FIG. 6 is applicable to a variety of other wavelengths that may be of interest in various applications. In FIG. 6 reflectivity as a function of wavelength is plotted to the dependent axis on the left, and PSD as a function of wavelength is plotted to the dependent axis on the right. The spectral distribution of reflectivity for the SS-FG demonstrates a primary reflection peak 620 that is centered at the peak Raman wavelength $\lambda_r$ (e.g., ~1135 nm). This "Raman" reflection peak 620 has a strong grating reflectivity of ~1.0 at the peak Raman wavelength $\lambda_r$, enabling the SS-FG to suppress Raman from laser oscillator emission. The Raman PSD spectrum 650 illustrated in dashed line is representative of a Raman power spectrum pumped by a signal PSD spectrum 660 having a peak signal wavelength $\lambda_r$ (e.g., ~1080 nm) and what would be emitted from the oscillator absent the Raman reflection peak 620. In contrast, in the presence of reflection peak 620, the Raman power spectrum 665 exiting an oscillator through the SS-FG is of a significantly lower power and is notched into a multi-modal (e.g., double peaked) spectrum as a function of the bandwidth overlap between the SS-FG reflection and Raman PSD spectrums. The remaining Raman power spectrum reflected by SS-FG may be transmitted through the other reflector, for example where that reflector has narrow band reflectivity that is centered at the peak signal wavelength $\lambda_s$.

Secondary reflection peaks 621 at wavelengths outside of the Raman band periodically peak at a lower reflectivity values (e.g., ~0.2). The illustrated example shows how the SS-FG may be designed to have one of the secondary reflection peaks 621 centered at a predetermined peak signal wavelength $\lambda_s$ (e.g., ~1080 nm), enabling the SS-FG to have sufficient reflection for oscillator operation and to serve the additional function of signal output coupler. Signal PSD spectrum 660 represents a signal that may be output from a resonant cavity through an SS-FG having a desired reflectivity at the peak signal wavelength $\lambda_s$.

Figure 7:
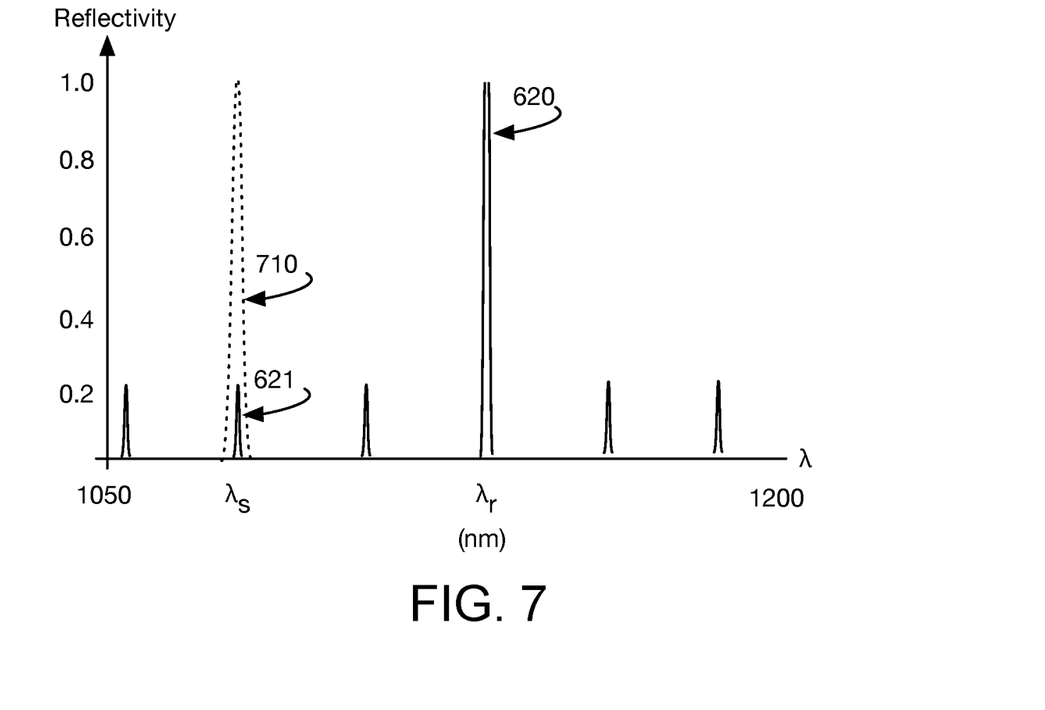
FIG. 7 is a graph illustrating reflectivity of a SS-FG and a high reflector of a fiber laser oscillator, in accordance with some embodiments.

The SS-FG responses illustrated in FIG. 6 are therefore well suited to laser oscillator 200 (FIG. 2) where Raman reflective output coupler 220 complements fiber grating 215, which has a suitable high reflector FBG architecture that is also centered at the peak signal wavelength $\lambda_s$. For example, in FIG. 7 the strong reflection peak 710 displayed by fiber grating 215 at the peak signal wavelength $\lambda_s$ is shown in dashed line for comparison to the weaker reflection peak 621 displayed by the SS-FG. The strong reflection peak 620 displayed by the SS-FG at the peak Raman wavelength $\lambda_r$ is further shown for comparison to the signal reflection peaks. In this example, fiber grating 215 is designed to have slightly more reflection bandwidth than the SS-FG, which may advantageously capture the entire signal bandwidth of the SS-FG OC.

In some other embodiments, a laser oscillator comprises an aperiodic (i.e., chirped) superstructure fiber grating. Relative to periodic superstructure embodiments, embodiments comprising chirp of either the refractive index amplitude modulation or period may offer a wider reflection bandwidth at each reflection peak, better countering the greater width of Raman spectrum for greater suppression of a Raman component from oscillator emission.

Figure 5C:
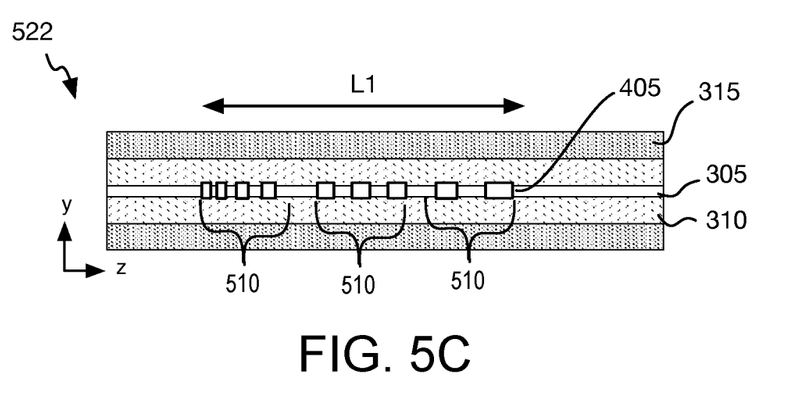
FIG. 5C is a longitudinal cross-sectional view of a chirped SS-FG, in accordance with some embodiments.

FIG. 5C is an expanded cross-sectional view of a length of fiber that includes a chirped SS-FG 522, in accordance with some embodiments. A chirped SS-FG 522 may be employed as Raman reflective output coupler 220 (FIG. 2). In the example illustrated, chirped SS-FG 522 again comprises refractive index (RI) perturbations 405 within at least fiber core 305 over a superstructure grating length L1. As noted above, structural modulations of the grating can be located within the cladding, or even comprise external surface perturbations in addition to, or in the alternative to, the core modulations illustrated. Within the double-clad fiber, RI perturbations 405 have a refractive index $n_4$ that is higher than a nominal core index $n_3$, both of which are further illustrated in FIG. 5D for an exemplary period chirped SS-FG. For embodiments where outer cladding 315 has an index $n_1$, and inner cladding 310 has an index $n_2$, RI within mode chirped SS-FG 522 may vary as $n_1 < n_2 < n_3 < n_4$.

Figure 5D:
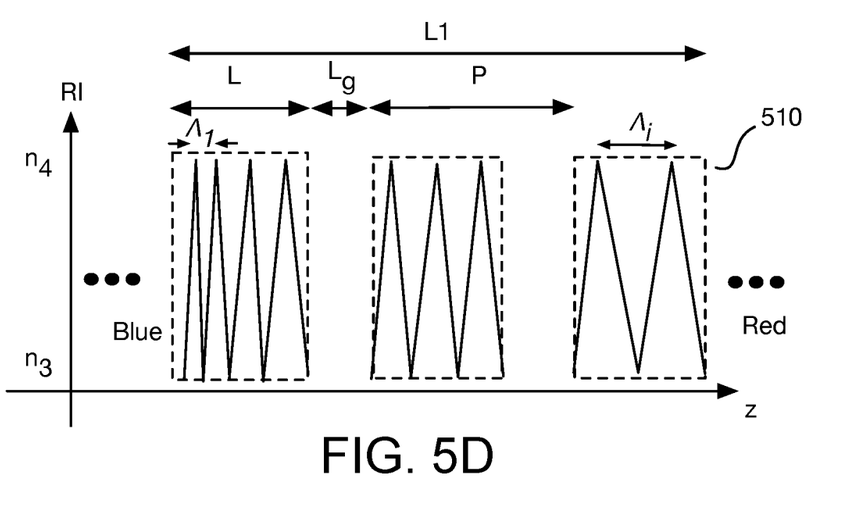
FIG. 5D is a graph of refractive index modulation within a chirped SS-FG, in accordance with some embodiments.

As further shown in 5D, RI perturbations 405 have a period that varies over subgrating length L2. The individual subgratings 510 may be identically chirped sub-gratings, or each sub-grating may have different chirp. In the illustrated embodiments, chirp is varied continuously over superstructure grating length L1. In one example, subgrating period $\Lambda$ begins at a blue end of chirped SS-FG 522 with a minimum period $\Lambda_1$, and linearly increases across the entire grating length L1 to a maximum period $\Lambda_i$ as if there were no gaps. In another example, grating index modulation is similarly varied across the entire grating length L1. In either example, super structure may then be created by periodically breaking up the chirp(s) with gaps, which in the illustrated example are uniform (equal) over grating length L1. Superstructure gratings with chirp varied over the entire grating length L1 will widen the reflection peaks (e.g., to generate the reflection spectra illustrated in FIG. 8 and described further below). Such superstructure gratings may also be fabricated with a single chirped phase mask, and a single amplitude mask to create gaps between subgratings 510. In contrast, identical chirping of the individual sub-gratings 510 may widen the envelope of reflection peaks, but not necessarily widen the reflection peaks themselves. Fabrication of such a grating may be, for example, through point by point writing.

Each subgrating 510 is longitudinally asymmetric having a first "blue" end with and a second "red" end. Chirped SS-FG 522 is therefore asymmetric with the blue ends of the sub-gratings all facing a blue end of chirped SS-FG 522. Grating periods $\Lambda_i$ and $\Lambda_j$ may each vary based on the Raman spectrum to which chirped SS-FG 522 is tuned. In exemplary embodiments, the shortest grating period $\Lambda_1$ is less than half of a center Raman wavelength. Hence, in some examples where the center Raman wavelength is around 1080 nm, the shortest grating period $\Lambda_1$ is 200-550 nm. The grating period may vary between the shortest and longest periods, for example by 10s or 100s of nm, according to any function (e.g., linear) over grating length L. The long superstructure grating period P may also be chirped, for example where gap length $L_g$ is a function of z (not depicted). Chirping of the grating period P may, for example, narrow a reflection peak at a targeted Raman wavelength, and then wider peaks at the other side lobes. Alternatively, or additionally, the magnitude of index modulation may be chirped, for example where $n_4$ and/or $n_3$ are a function of z (not depicted).

Figure 8:
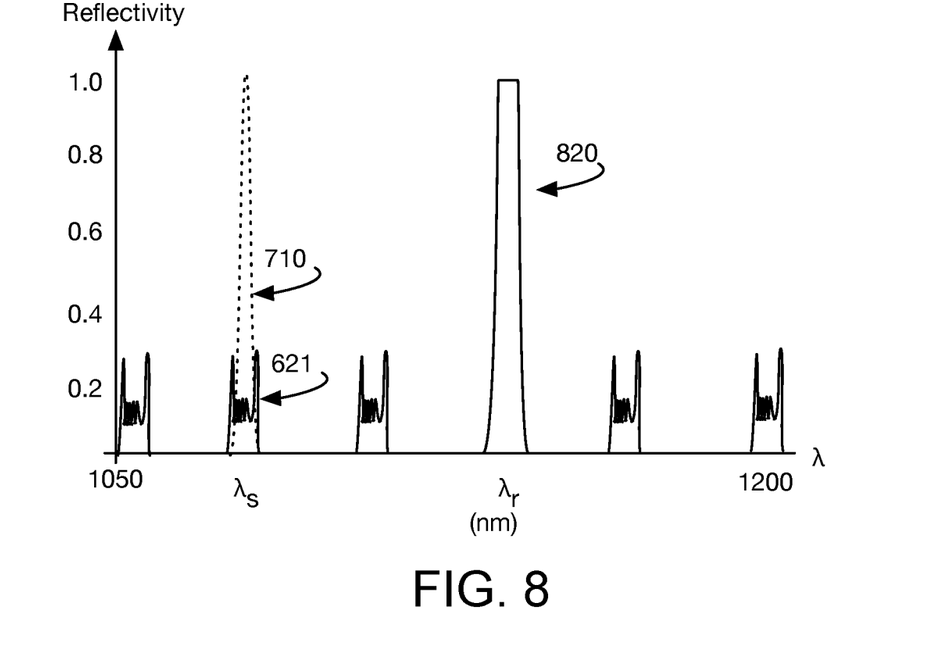
FIG. 8 is a graph illustrating reflectivity of a SS-FG and a high reflector of a fiber laser oscillator, in accordance with some alternative embodiments.

FIG. 8 is a graph illustrating reflectivity of a chirped SS-FG OC and a high reflector of a fiber laser oscillator. The reflectivity responses illustrated in FIG. 8 are representative of fiber gratings that are suitable for use in fiber laser oscillator 200 (FIG. 2), for example. In comparison to the corresponding reflectivity responses shown in FIG. 7, the broader reflection bandwidth of the chirped SS-FG is evident in the strong reflection peak 820 displayed by chirped SS-FG OC at the peak Raman wavelength $\lambda_r$. The width of the strong reflection peak 820 is also greater than the width of strong reflection peak 710 displayed by fiber grating 215 at the peak signal wavelength $\lambda_s$. The weaker reflection peak 621 displayed by chirped SS-FG is also wider. In this example, fiber grating 215 is designed to have slightly less signal reflection bandwidth than the chirped SS-FG, which may be advantageous for defining the signal bandwidth of the oscillator.

Figure 9:
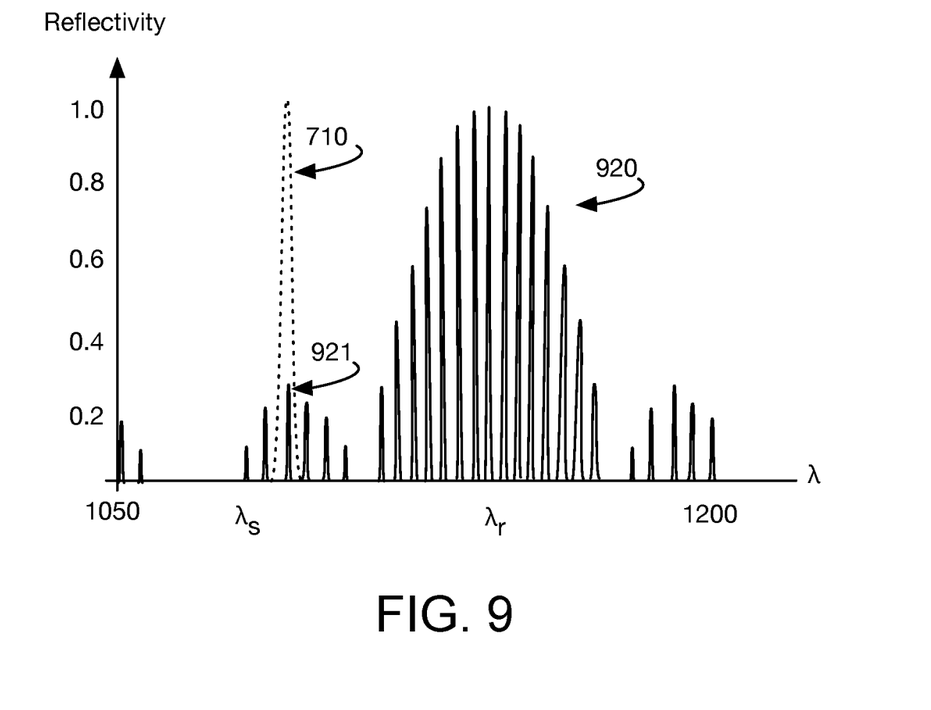
FIG. 9 is a graph illustrating reflectivity of a SS-FG and a high reflector of a fiber laser oscillator, in accordance with some alternative embodiments.

For the SS-FG embodiments described above there is one reflection peak within the Raman band. In alternative embodiments, a SS-FG may display more than one such reflection peak within the Raman band. For such embodiments, the high reflectivity bandwidth is effectively broader, which offers the advantage of greater Raman suppression without a chirped architecture. FIG. 9 is a graph illustrating reflectivity of a Raman reflective output coupler and a high reflector of a fiber laser oscillator, in accordance with some such embodiments. The reflectivity responses illustrated in FIG. 8 are representative of fiber gratings that are suitable for use in fiber laser oscillator 200 (FIG. 2), for example. Multiple strong reflection peaks 920 are closely spaced (e.g., by less than 5 nm) and span the Raman band. As shown, the strongest set of peaks are centered at the peak Raman wavelength $\lambda_r$ with each reflection peak that is closer to the peak Raman wavelength $\lambda_r$ being more reflective. The strong reflection peak 710 displayed by fiber grating 215 is further illustrated in dashed line for comparison. As shown, one lesser reflection peak 921 is at the peak signal wavelength $\lambda_s$ to maintain OC functionality. In this example, fiber grating 215 is designed to have slightly greater signal reflection bandwidth than the SS-FG, which may be advantageous for capturing all the signal bandwidth of SS-FG.

Figure 10:
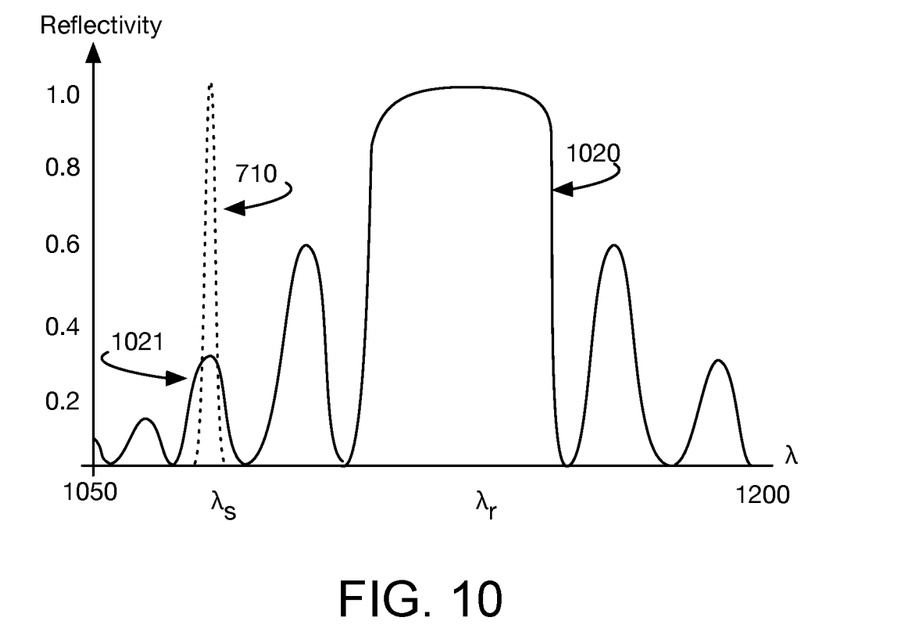
FIG. 10 is a graph illustrating reflectivity of a fiber Bragg grating (FBG) and a high reflector of a fiber laser oscillator, in accordance with some alternative embodiments.

The Raman reflective output couplers described above provide good SRS suppression and signal OC functionality even where the magnitude index of refraction modulation is limited (e.g., less than $10^{-2}$). For materials systems where larger RI modulation is possible (e.g., $10^{-2}$, or greater), a short uniform FBG becomes more capable of achieving acceptable SRS suppression and signal OC performance. For such embodiments, a single, short strong grating may provide broad reflectivity centered over the Raman wavelengths, and partial reflectivity for the signal OC within the side lobes of the reflection spectrum. As for a chirped SS-FG, a high reflector grating may be fabricated for narrow spectral bandwidth to complete the oscillator cavity. Apodization may also be employed to further tune the strength of the side lobes for the sake of emitting a desired fraction of the signal power. FIG. 10 is a graph illustrating reflectivity of an FBG, and of a high reflector in a fiber laser oscillator, in accordance with some alternative embodiments having large grating index contrast. The broad Raman reflection peak 1020 is centered over the peak Raman wavelength $\lambda_r$. Raman reflection peak 1020 is nearly 1.0 over a bandwidth exceeding 50 nm in this example where grating index contrast is $\sim 10^{-2}$. One of the side lobes provides a reflection peak 1021 centered over the peak signal wavelength $\lambda_s$. The high reflector reflection peak 710 is again shown in dashed line for comparison. For these embodiments, the high reflector may be fabricated with narrow bandwidth for to complete the oscillator cavity and define the signal spectrum that is emitted from the cavity.

Figure 11:
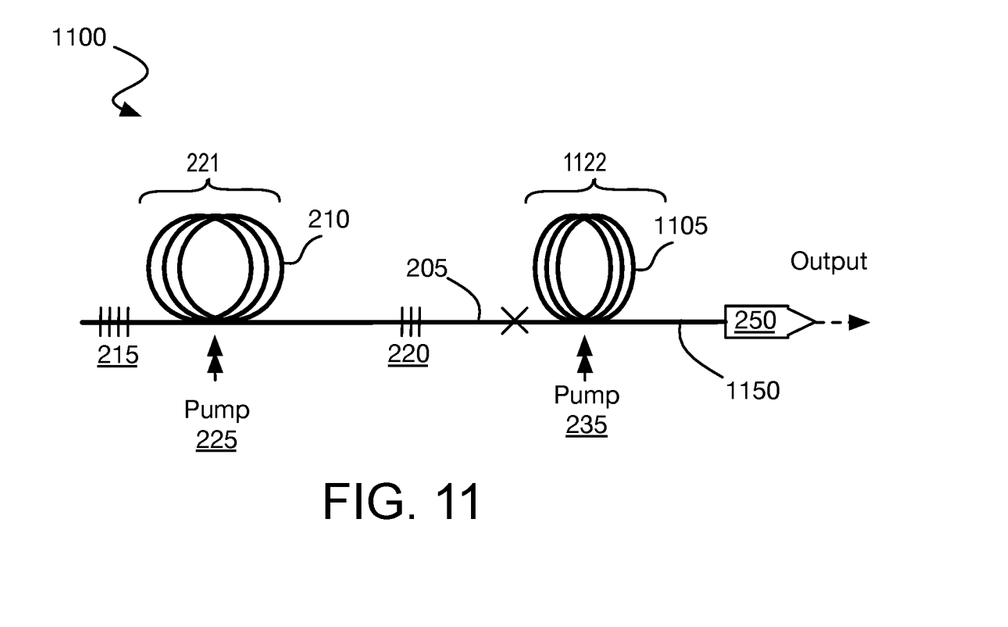
FIG. 11 is a schematic of a master oscillator power amplifier (MOPA) system having reduced Raman spectrum pumping, in accordance with some embodiments.

The laser oscillator cavity architectures described above may be implemented within a variety of laser devices and systems according to a wide range of applications. As one example, FIG. 11 depicts a schematic of a master oscillator power amplifier (MOPA) system 1100 having reduced Raman spectrum pumping. MOPA system 1100 may be suitable for high power fiber laser applications, such as materials processing, etc. System 1100 includes fiber laser oscillator 221 that is to generate an optical beam substantially as described above. Raman filtering OC 220 may be any Raman reflective grating suitable for coupling signal spectrum out of the resonant cavity, and may, for example have any of the attributes described above. Fiber laser oscillator 221 is optically coupled to a fiber power amplifier 1122 through Raman filtering OC 220. Fiber amplifier 1122 is to increase the radiance of at least the signal spectrum excited by oscillator 221. Fiber amplifier 1122 includes a length of doped fiber length 1105, which may have any of the properties described above for doped fiber length 210. For example, in some embodiments, doped fiber length 1105 comprises rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like, or any combination thereof. Power amplifier may be pumped by any pump light source 235 (e.g., laser diode, lamp, etc.) as embodiments herein are not limited in this respect. In some embodiments, doped fiber 1105 comprises a multi-mode fiber supporting multiple propagation modes within a fiber core. In some advantageous embodiments where doped fiber length 210 comprises single-mode fiber capable of supporting only one guided propagation mode within the fiber core, doped fiber 1105 comprises a multi-mode fiber capable of supporting multiple propagation modes within the fiber core.

In accordance with the illustrated embodiments, fiber amplifier 1122 is positioned between Raman filtering OC 220 and a delivery fiber 1150. Delivery fiber 1150 is further coupled to a process head 250 where the optical beam propagating in delivery fiber 1150 may be launched into free-space propagation.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should therefore be determined with reference to the appended claims, along with the full scope of equivalents to which such claims are entitled.

What is claimed is:

1. A fiber laser oscillator to generate a light beam, the fiber laser oscillator comprising:
    a length of optical fiber comprising a core and one or more cladding layers, wherein at least a portion of the length of the optical fiber is doped with a gain medium operable to excite at least a signal component of the light beam, the signal component associated with a first peak wavelength;
    a first reflector proximal to a first end of the length of optical fiber; and
    an output coupler separated from the first reflector by at least the length of optical fiber, wherein the output coupler has a lower reflectivity at the first peak wavelength than at a second peak wavelength associated with a Raman component of the light beam,
    wherein:
        the first reflector has a higher reflectivity at the first peak wavelength than at the second peak wavelength;
        the Raman component is to propagate in a fundamental core mode of the length of optical fiber; and the output coupler comprises a superstructure fiber grating (SS-FG) that is to reflect the Raman component into a counter-propagating core mode of the length of optical fiber.

2. The fiber laser oscillator of claim 1, wherein the first reflector has a narrower bandwidth than the output coupler.

3. The laser oscillator of claim 1, wherein the SS-FG comprises one or more chirped refractive index modulations having a periodicity, or magnitude of refractive index modulation, that varies over a length of the SS-FG.

4. The fiber laser oscillator of claim 3, wherein the chirped refractive index modulations have a first end with a shortest grating period proximal to the length of optical fiber, and a second end with a longest period proximal to a second length of optical fiber that is separated from the first length of optical fiber by the SS-FG.

5. The fiber laser oscillator of claim 1, wherein the SS-FG has a single reflectivity peak within a Raman band.

6. The fiber laser oscillator of claim 1, wherein the SS-FG has a plurality of reflectivity peaks within a Raman band.

7. The fiber laser oscillator of claim 1, wherein:
at least one of the first or second peak wavelengths is to be between 1000 nm and 1200 nm;
the second peak wavelength is longer than the first peak wavelength by at least 40 nm; and
the one or more cladding layers of the length of optical fiber further comprise an inner cladding layer, and an outer cladding layer in contact with the inner cladding layer.

8. The fiber laser oscillator of claim 7, wherein the length of optical fiber supports only one core propagation mode and the SS-FG comprises refractive index modulations within the core.

9. A fiber laser system, comprising:
the fiber laser oscillator of claim 1; and
a fiber power amplifier coupled to receive a portion of the signal component through the output coupler.

10. The system of claim 9, further comprising
a delivery fiber coupled to the fiber power amplifier; and
a process head coupled to the delivery fiber to launch an optical beam into free space.

11. A fiber laser system, comprising:
a fiber laser oscillator to generate a light beam, wherein the fiber laser oscillator comprises:
a length of optical fiber comprising a core and one or more cladding layers, wherein at least a portion of the length of optical fiber is doped with a gain medium operable to excite at least a signal component of the light beam, the signal component associated with a first peak wavelength;
a first reflector proximal to a first end of the length of optical fiber, wherein the first reflector has a higher reflectivity at the first peak wavelength than at the second peak wavelength; and
an output coupler separated from the first reflector by at least the length of optical fiber, wherein the output coupler has a lower reflectivity at the first peak wavelength than at a second peak wavelength associated with a Raman component of the light beam, wherein:
the first reflector has a higher reflectivity at the first peak wavelength than at the second peak wavelength;
the Raman component is to propagate in a fundamental core mode of the length of optical fiber; and
the output coupler comprises a superstructure fiber grating (SS-FG) that is to reflect the Raman component into a counter-propagating core mode of the length of optical fiber; and
a fiber power amplifier coupled to receive a portion of the signal spectrum through the output coupler.

12. A method of generating a light beam, the method comprising:
energizing a fundamental propagation mode of light within a first length of optical fiber, wherein the first length of optical fiber comprises a core doped with an optical gain media and at least one cladding layer, and wherein the light comprises a signal component associated with a first peak wavelength, and a Raman component associated with a second peak wavelength;
reflecting the light into the fundamental mode with a first reflector at a first end of the first length of optical fiber;
reflecting the light into the fundamental mode with a second reflector at a second end of the first length of optical fiber, wherein the second reflector has a higher reflectivity at the second peak wavelength than the first peak wavelength, the second reflector comprises a superstructure fiber grating (SS-FG), and the first reflector has a higher reflectivity at the first peak wavelength than at the second peak wavelength;
propagating in a second length of optical fiber a fraction of energy associated with the signal component that is transmitted through the second reflector; and
dumping energy associated with the Raman component that is transmitted through the first reflector.

13. The method of claim 12, wherein the first reflector has a narrower bandwidth than the second reflector.

14. The method of claim 12, wherein the SS-FG comprises one or more chirped refractive index modulations having a periodicity that varies, with a shortest grating period proximal to the first length of optical fiber, and longest period proximal to the second length of optical fiber.

15. The method of claim 12, wherein the SS-FG has a plurality of reflectivity peaks within a Raman band.

16. The method of claim 12, wherein:
at least one of the first or second peak wavelengths is between 1000 nm and 1200 nm;
the second peak wavelength is longer than the first peak wavelength by at least 40 nm;
the at least one cladding layer comprises an inner cladding layer, and an outer cladding layer in contact with the inner cladding layer;
the signal component is to have an optical power that is at least 1 kW; and
the first length of optical fiber supports only one propagation mode.

* * * * *